United States Patent
Norrga (10) Patent No.: US 9,484,808 B2
(45) Date of Patent: Nov. 1, 2016

(54) BIDIRECTIONAL UNISOLATED DC-DC CONVERTER BASED ON CASCADED CELLS

(75) Inventor: Staffan Norrga, Stockholm (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/234,993

(22) PCT Filed: Aug. 24, 2011

(86) PCT No.: PCT/EP2011/064523
§ 371 (c)(1),
(2), (4) Date: Jan. 24, 2014

(87) PCT Pub. No.: WO2013/026477
PCT Pub. Date: Feb. 28, 2013

(65) Prior Publication Data
US 2014/0160812 A1 Jun. 12, 2014

(51) Int. Cl.
*H02M 3/07* (2006.01)
*H02M 7/00* (2006.01)
(Continued)

(52) U.S. Cl.
CPC .................. *H02M 3/07* (2013.01); *H02J 3/36* (2013.01); *H02M 3/158* (2013.01); *H02M 3/28* (2013.01); *H02M 7/00* (2013.01); *H02M 2007/4835* (2013.01); *Y02E 60/60* (2013.01)

(58) Field of Classification Search
CPC ................................ H02M 3/07; H02M 7/537
USPC ...... 363/15, 87, 109, 37, 127; 323/272, 266, 323/222
See application file for complete search history.

(56) References Cited

U.S. PATENT DOCUMENTS

| 5,914,572 A * | 6/1999 | Qian ....................... H05B 37/02 315/307 |
| 2006/0028187 A1* | 2/2006 | Kim .............................. 323/272 |

(Continued)

FOREIGN PATENT DOCUMENTS

| CN | 101268607 A | 9/2008 |
| DE | 10 2005 045 090 A1 | 4/2007 |

(Continued)

OTHER PUBLICATIONS

Korn et al., "Low Output Frequency Operation of the Modular Multi-Level Converter", Sep. 12, 2010, XP031787020, pp. 3993-3997.

*Primary Examiner* — Matthew V Nguyen
*Assistant Examiner* — Trinh Dang
(74) *Attorney, Agent, or Firm* — Birch, Stewart, Kolasch & Birch, LLP (57) ABSTRACT

A DC-DC converter (200) comprising a first (201) and a second (202) variable voltage source, a capacitor (203), an alternating current filter (204), and controlling means (205), is provided. A first DC voltage ($U_{DC1}$) is provided over a series-connection of the first and the second voltage source, and a second DC voltage ($U_{DC2}$), being lower in magnitude than ($U_{DC1}$), is provided over the second voltage source. The conversion between ($U_{DC1}$) and ($U_{DC2}$) is effected by circulating an alternating current within a circuit comprising the two voltage sources and the capacitor, thereby exchanging power between the two voltage sources. The alternating current is driven by AC voltage components provided by the first and the second voltage source. The controlling means is arranged for controlling the first and the second voltage source so as to maintain a phase difference between the AC components to be close to π.

18 Claims, 9 Drawing Sheets

(51) Int. Cl.
*H02M 3/28* (2006.01)
*H02M 3/158* (2006.01)
*H02J 3/36* (2006.01)
*H02M 7/483* (2007.01)

(56) References Cited

U.S. PATENT DOCUMENTS

2007/0230226 A1* 10/2007 Lai et al. .................. 363/65
2008/0310205 A1* 12/2008 Hiller ....................... 363/131
2009/0256535 A1* 10/2009 Houston et al. ............. 323/262
2010/0141188 A1* 6/2010 Kakebayashi et al. .... 318/400.3
2011/0018481 A1 1/2011 Hiller
2011/0025447 A1* 2/2011 Jacobson et al. ........... 336/84 C
2011/0175441 A1* 7/2011 Langlois et al. ............ 307/9.1
2011/0193495 A1* 8/2011 Mishima et al. ............ 315/307
2011/0247900 A1* 10/2011 Blasko et al. ............... 187/247

FOREIGN PATENT DOCUMENTS

DE     10 2008 014 898 A1   9/2009
WO     WO 2010/145690 A1    12/2010
WO     WO 2011/060812 A1    5/2011

* cited by examiner

BIDIRECTIONAL UNISOLATED DC-DC CONVERTER BASED ON CASCADED CELLS

FIELD OF THE INVENTION

The invention relates in general to power electronic converters for high voltage direct current (HVDC) power transmission and distribution, as well as railway traction systems. More specifically, the invention relates to unisolated, i.e., galvanically not isolated, DC-DC converters employing several series-connected converter modules.

BACKGROUND OF THE INVENTION

In order to reduce the harmonic distortion of the output voltage of power electronic converters, so called multilevel converters based on cell strings, providing an output voltage which may assume several discrete levels, have been proposed. A cell string typically comprises a plurality of series-connected converter cells, where each cell contains a number of switching elements, e.g., transistors, and an energy storage element in form of a capacitor, connected either in a half-bridge or a full-bridge type arrangement.

Figure 1:
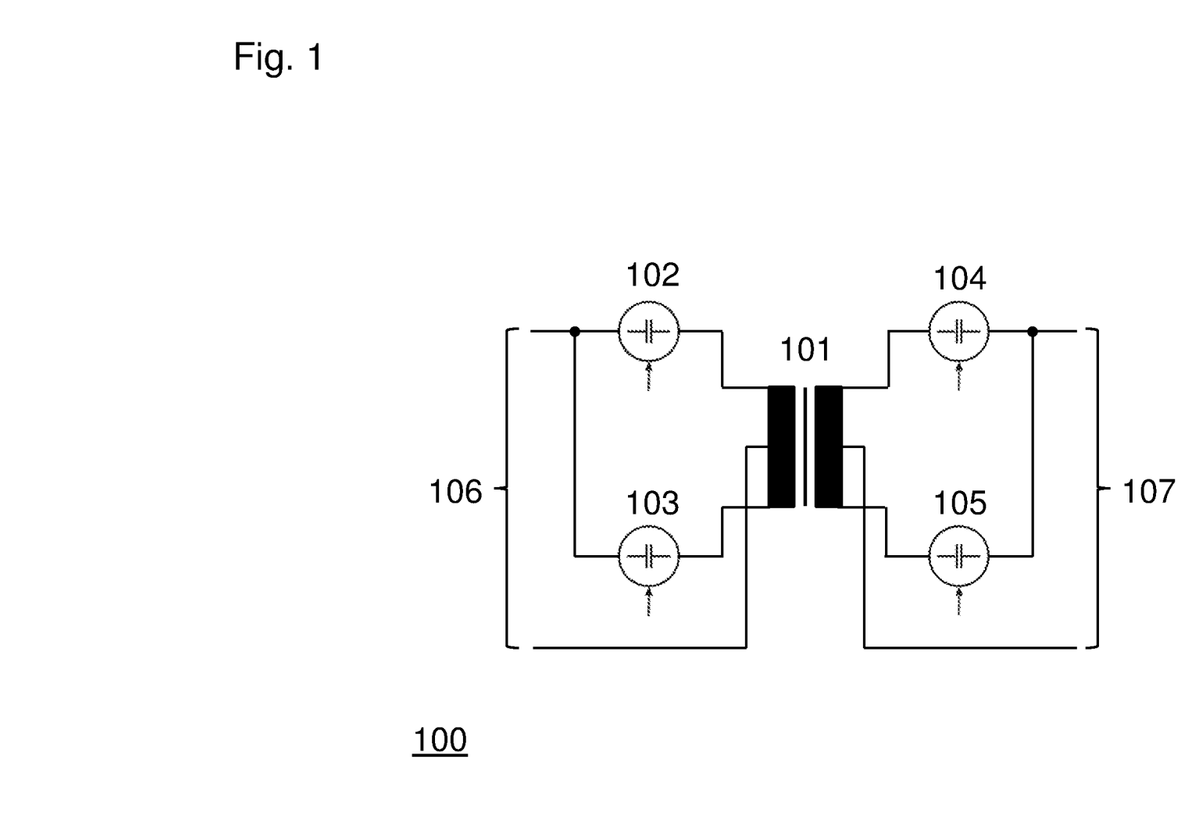
FIG. 1 is a prior art transformer-based DC-DC converter.

A converter for converting between direct current (DC) voltages is herein denoted a DC-DC converter. DC-DC converters are known which are based on the concept of the above described cascaded, i.e., series-connected, converter cells. Typically, such a converter 100, as illustrated in FIG. 1, is based on a transformer 101 and two strings 102-105 of converter cells on each side of transformer 101. Each string 102-105 of converter cells is arranged for providing a DC voltage towards its respective DC terminal 106/107, and an alternating current (AC) voltage towards transformer 101. Transformer 101 allows to adjust the AC voltage levels, which, in turn, results in an offset of the DC voltages between the two terminals 106 and 107. However, due to the transformer, such solutions suffer from additional power losses. Further, the transformer incurs extra costs.

SUMMARY OF THE INVENTION

It is an object of the present invention to provide a more efficient alternative to the above techniques and prior art.

More specifically, it is an object of the present invention to provide an improved DC-DC conversion for power electronics applications. In particular, it is a further object of the present invention to provide an improved DC-DC conversion for HVDC applications.

These and other objects of the present invention are achieved by means of a DC-DC converter having the features defined in independent claim 1, by means of a DC-DC converter having the features defined in independent claim 8, by means of a method of a DC-DC converter defined in independent claim 11, and by means of a method of a DC-DC converter defined in independent claim 13. Embodiments of the invention are characterized by the dependent claims.

According to a first aspect of the invention, a DC-DC converter is provided. The DC-DC converter comprises a first phase leg and controlling means. The first phase leg has a first, a second, and a third connection terminal. The first phase leg comprises a first and a second variable voltage source, a first capacitor, and an AC filter. The first and the second variable voltage source are arranged for providing a first and a second voltage, respectively. Each voltage source has a first pole and a second pole. The first pole of the first voltage source is connected to the first terminal of the phase leg. The second pole of the first voltage source is connected to the first pole of the second voltage source. The second pole of the second voltage source is connected to the second terminal of the phase leg. A first DC voltage is provided between the first terminal and the second terminal of the phase leg. A second DC voltage is provided between the third terminal and the second terminal of the phase leg. The first capacitor is connected between the first terminal and the second terminal of the phase leg. The AC filter is connected between the first pole of the second voltage source and the third terminal of the phase leg. The controlling means is arranged for controlling the first and the second voltage source of the first phase leg. The first and the second voltage source are controlled so as to circulate an alternating current within a circuit comprising the first capacitor, the first voltage source, and the second voltage source, of the first phase leg.

According to a second aspect of the invention, a DC-DC converter is provided. The DC-DC converter comprises at least two phase legs and controlling means. Each phase leg has a first, a second, and a third connection terminal. The at least two phase legs are connected in parallel. Each phase leg comprises a first and a second variable voltage source. Each variable voltage source is arranged for providing a first and a second voltage, respectively. Each voltage source has a first pole and a second pole. The first pole of the first voltage source is connected to the first terminal of the phase leg. The second pole of the first voltage source is connected to the first pole of the second voltage source. The second pole of the second voltage source is connected to the second terminal of the phase leg. A first DC voltage is provided between the first terminal and the second terminal of the phase leg. A second DC voltage is provided between the third terminal and the second terminal of the phase leg. The controlling means is arranged for controlling the first and the second voltage source of each phase leg. The first and the second voltage source of each phase leg are controlled so as to circulate an AC current within a circuit comprising the first and the second voltage source of each phase leg. Further, the first and the second voltage source of each phase leg are controlled so as to maintain a constant phase difference between the respective AC currents of the phase legs.

According to a third aspect of the invention, a method of a DC-DC converter is provided. The DC-DC converter comprises a first phase leg. The first phase leg has a first, a second, and a third connection terminal. The first phase leg comprises a first and a second variable voltage source, a first capacitor, and an AC filter. The first and the second variable voltage source are arranged for providing a first and a second voltage, respectively. Each voltage source has a first pole and a second pole. The first pole of the first voltage source is connected to the first terminal of the phase leg. The second pole of the first voltage source is connected to the first pole of the second voltage source. The second pole of the second voltage source is connected to the second terminal of the phase leg. A first DC voltage is provided between the first terminal and the second terminal of the first phase leg. A second DC voltage is provided between the third terminal and the second terminal of the phase leg. The first capacitor is connected between the first terminal and the second terminal of the phase leg. The AC filter is connected between the first pole of the second voltage source and the third terminal of the phase leg. The method comprises controlling the first and the second voltage source of the first phase leg. The first and the second voltage source are controlled so as to circulate an alternating current within a circuit comprising the first capacitor, the first voltage source, and the second voltage source, of the first phase leg.

According to a fourth aspect of the invention, a method of a DC-DC converter is provided. The DC-DC converter comprises at least two phase legs and controlling means. Each phase leg has a first, a second, and a third connection terminal. The at least two phase legs are connected in parallel. Each phase leg comprises a first and a second variable voltage source. Each variable voltage source is arranged for providing a first and a second voltage, respectively. Each voltage source has a first pole and a second pole. The first pole of the first voltage source is connected to the first terminal of the phase leg. The second pole of the first voltage source is connected to the first pole of the second voltage source. The second pole of the second voltage source is connected to the second terminal of the phase leg. A first DC voltage is provided between the first terminal and the second terminal of the phase leg. A second DC voltage is provided between the third terminal and the second terminal of the phase leg. The method comprises controlling the first and the second voltage source of each phase leg. The first and the second voltage source of each phase leg are controlled so as to circulate an AC current within a circuit comprising the first and the second voltage source of each phase leg. Further, a constant phase difference between the respective AC currents of the phase legs is maintained.

The present invention makes use of an understanding that a conversion of a first DC voltage into a second DC voltage, or vice versa, which second DC voltage is lower in magnitude than the first DC voltage, may be achieved by a converter comprising at least one phase leg having two variable, i.e., controllable, voltage sources connected in series, wherein each voltage source is arranged for providing a DC voltage as well as an AC voltage, and wherein the second DC voltage is provided across one of the voltage sources. A converter according to an embodiment of the invention is arranged for circulating an alternating current within the converter, thereby exchanging power between the voltage sources.

This may, e.g., be achieved by a converter in accordance with an embodiment of the first aspect of the invention, which converter further comprises a capacitor connected in parallel to the first DC voltage, i.e., in parallel to the series-connection of the two voltage sources, so as to close the circuit used for circulating the alternating current. More specifically, due to the AC voltage components provided by the two voltage sources, in addition to the DC components giving rise to the first and the second DC voltage, respectively, an alternating current is circulated within the converter circuit, driven by the sum of the AC voltage components of the first and the second voltage source. The alternating current is driven through a circuit comprising the two voltage sources and the capacitor. In other words, the two voltage sources are controlled so as to provide an AC voltage which gives rise to an alternating current. The circulating alternating current permits the transfer of power between the two voltage sources. Further, an AC filter is provided in order to limit the disturbance of the AC voltage components on the DC voltages.

As an alternative, the object of the invention may also be achieved by a converter according to an embodiment of the second aspect of the invention, the converter comprising at least two phase legs, wherein each phase leg comprises the two aforementioned controllable voltage sources. In this case, the exchange of power between the voltage sources is accomplished by circulating an alternating current between the multiple phase legs. More specifically, due to the AC voltage components provided by the two voltage sources in each phase leg, in addition to the DC components giving rise to the first and the second DC voltage, an alternating current is circulated within the converter circuit, driven by the AC voltage components in each phase leg. The alternating current is driven through a circuit comprising the at least two phase legs and permits the transfer of power between the voltage sources of in each phase leg. The controlling means is further arranged for controlling the respective first and second voltage source of the phase legs, and for maintaining a constant phase difference between the respective AC currents of the phase legs. Preferably, the converter comprises more than two identical phase legs connected in parallel. An embodiment of the invention comprising multiple phase legs, and wherein the respective alternating currents circulating in each phase leg differ by a constant phase difference, is advantageous in that the power rating of the converter may be increased and in that the harmonic interaction, due to the AC voltage components and the alternating current, with the DC voltages may be reduced.

An embodiment of the invention is advantageous in that DC-DC conversion may be achieved without utilizing a transformer, resulting in a DC-DC converter which is less expensive and which has reduced power losses, as compared to prior art solutions.

Further, an embodiment of the invention is advantageous in that a power flow through the converter can be in either directions, i.e., current may either flow from the first-DC-voltage side to the second-DC-voltage side, or vice versa. In other words, the converter is bidirectional.

According to an embodiment of the invention, the controlling means is arranged for controlling the first and the second voltage source so as to maintain a phase difference between an AC component of the first voltage and an AC component of the second voltage. The phase difference is maintained to be close to $\pi$. By maintaining the phase difference such that the two AC components are nearly in antiphase with each other, the power exchange between the two voltage sources may be maximized. This is advantageous in that the efficiency of the converter is improved. In this respect, the term "close" is to be understood as meaning that the phase difference is preferably kept as close to $\pi$ as possible, limited by a reactive voltage drop over the capacitor. In the present disclosure, all phases are in units of radians.

According to an embodiment of the invention, each phase leg further comprises a first inductor. The first inductor is connected in series with the first capacitor. The series-connection of capacitor and inductor constitutes a resonance circuit with a resonance frequency which is determined by the inductance and the capacitance, respectively, of the two components. Using a resonance circuit for closing the AC-current path is advantageous in that the resonance frequency of the circuit may be chosen to match the desired frequency of the alternating current, which frequency is given by the AC component of the voltage provided by the two voltage sources, which, in turn, is controlled by the controlling means. This is advantageous in that the capacitance of the capacitor may be reduced, owing to the low impedance of the resonance circuit at resonance. Alternatively, the magnitude of the AC components of the first and the second voltage may be reduced.

According to an embodiment of the invention, each variable voltage source comprises a plurality of converter cells. The converter cells are connected in series. Each converter cell comprises two switching elements and an energy storage element. The energy storage element is connected in series with the switching elements in a half-bridge type of fashion. The switching elements may, e.g., be insulated bipolar gate transistors (IGBTs). As an alternative, each converter cell may be of full-bridge type. It will also be appreciated that a combination of half-bridge and full-bridge type cells may be used within each cell string, thereby shifting the balance between DC and AC voltage components. This is advantageous if a high ratio between the first DC voltage and the second DC voltages is required.

According to an embodiment of the invention, the AC filter is an inductor. Using an inductor as AC filter is advantageous since it provides a solution which is less expensive than more advanced filters. As an alternative, the AC filter may be a parallel resonant series filter, comprising an inductor and a capacitor connected in parallel. As a further alternative, the AC filter may be a low-pass filter, comprising an inductor and a capacitor.

According to another embodiment of the invention, the converter further comprises a second phase leg. The second phase leg is identical to the first phase leg. The second terminal of the second phase leg is connected to the second terminal of the first phase leg. A third DC voltage is provided between the first terminal and the second terminal of the second phase leg. A fourth DC voltage is provided between the third terminal and the second terminal of the second phase leg. The controlling means is further arranged for controlling the first and the second voltage source of the second phase leg. The first and the second voltage source are controlled so as to circulate an AC current within a circuit comprising the first capacitor, the first voltage source, and the second voltage source, of the second phase leg. In other words, two DC-DC converters are combined two accomplish a bipolar DC-DC converter. This is advantageous for HVDC applications, where bipolar designs are frequently utilized. Preferably, the third DC voltage is equal in magnitude to the first DC voltage, and the fourth DC voltage is equal in magnitude to the second DC voltage.

According to an embodiment of the invention, the controlling means is further arranged for controlling the first and the second voltage source of each of the phase legs so as to maintain a phase difference between the AC current of the first phase leg and the AC current of the second phase leg to be close to $\pi$. This is advantageous in that the harmonic interaction may be eliminated.

According to an embodiment of the invention, the phase difference between the respective AC currents of two adjacent phase legs is equal to $2\pi/n$, where n is the number of phase legs in the converter. In the present context, the term "adjacent" is to be understood as being adjacent in phase. In other words, the phase differences are chose so as to achieve a symmetric multi-phase converter. For instance, if the converter comprises three phase legs, the phase difference between each pair of adjacent phase legs is preferably maintained at $2\pi/3$. This is advantageous in that the harmonic interaction may be eliminated. In this case, the AC filter may be dispensed with.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 2:
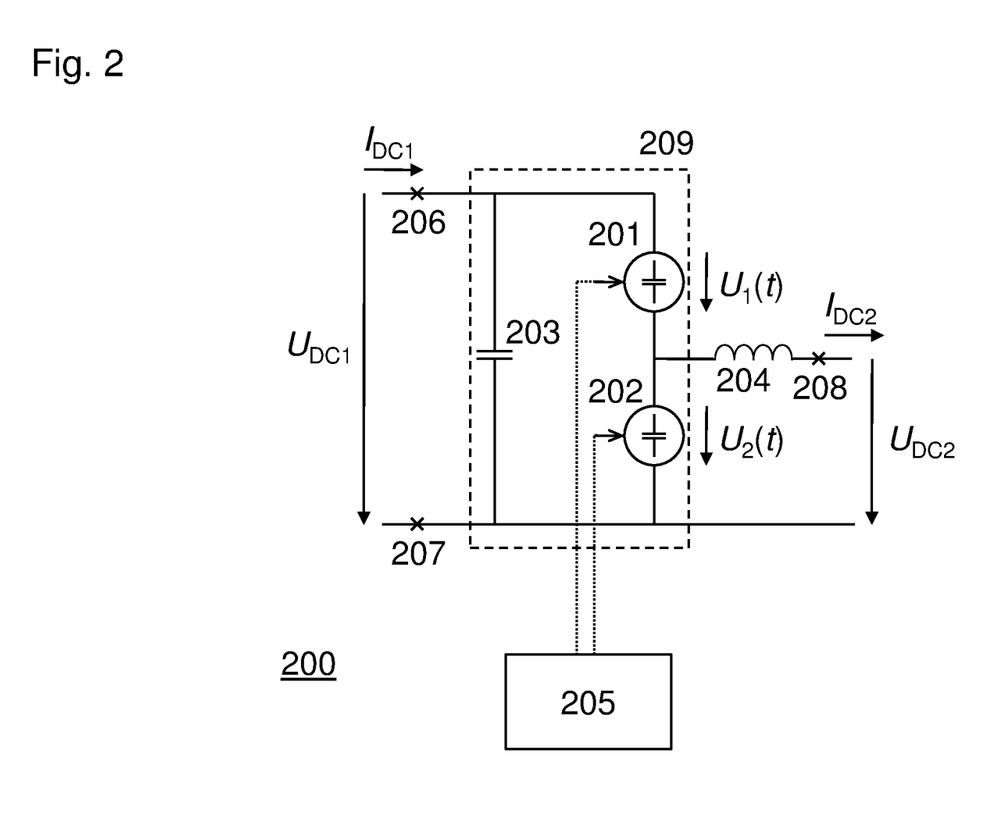
FIG. 2 illustrates a DC-DC converter, in accordance with an embodiment of the invention.

With reference to FIG. 2, a DC-DC converter in accordance with an embodiment of the invention is described.

DC-DC converter 200 comprises two variable voltage sources 201 and 202 connected in series, a capacitor 203 connected in parallel to the series-connection of voltage sources 201 and 202, as well as an AC filter 204, in FIG. 2 illustrated as an inductance. AC filter 204 may, e.g., be a reactor. Further, converter 200 comprises a control unit 205, for controlling variable voltage sources 201 and 202, i.e., for controlling the voltage $U_1(t)$ and $U_2(t)$ provided by 201 and 202, respectively. The operation of voltage sources 201 and 202 is elucidated further below. DC voltage $U_{DC1}$ and DC current $I_{DC1}$ are provided to circuitry connected to the high-voltage side of converter 200, i.e., to terminals 206 and 207, and DC voltage $U_{DC2}$ and DC current $I_{DC2}$ are provided to the low-voltage side of converter 200, i.e., to terminals 208 and 207. $U_{DC1}$ is provided in parallel to the series-connection of voltage sources 201 and 202, and $U_{DC2}$ is provided in parallel to voltage source 202. As is indicated by the dashed line 209 in FIG. 2, voltage sources 201 and 202, as well as capacitor 203, constitute a circuit in which an alternating current is circulated, as is described hereinbelow. The purpose of AC filter 204 is to reduce the interference of the alternating current circulating in converter 200 with external circuitry connected to the low-voltage side of converter 200.

Figure 3:
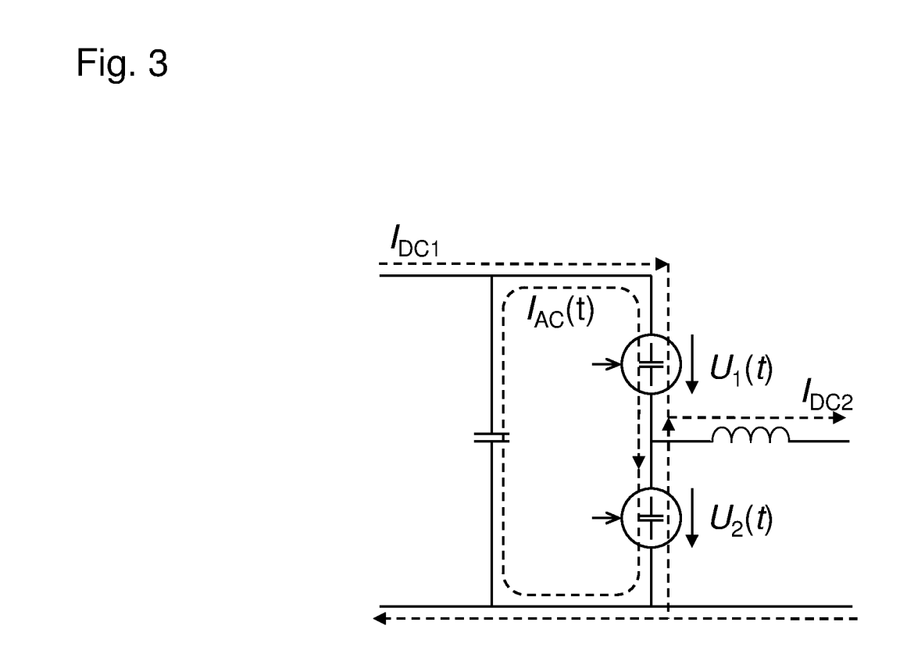
FIG. 3 illustrates the operation of the DC-DC converter shown in FIG. 2, in accordance with an embodiment of the invention.

With reference to FIG. 3, the principal of operation of DC-DC converter 200 is described. In addition to DC currents $I_{DC1}$ and $I_{DC2}$, the alternating current $I_{AC}(t)$ carried by circuit 209 is illustrated. Alternating current $I_{AC}(t)$ is a consequence of the sum of the AC components of voltages $U_1(t)$ and $U_2(t)$, provided by voltage sources 201 and 202, respectively. The circulating alternating current $I_{AC}(t)$ permits the transfer of power between voltage sources 201 and 202.

For the purpose of elucidating the principle of operation of converter 200, $U_1(t)$ provided by the first voltage source is defined as:

$$U_1(t) = (U_{DC1} - U_{DC2}) + U_{AC1}^0 \cdot \cos(\omega t + \phi_1) \qquad (1).$$

Correspondingly, $U_2(t)$ provided by the second voltage source is defined as:

$$U_2(t) = U_{DC2} + U_{AC2}^0 \cdot \cos(\omega t + \phi_2) \qquad (2).$$

The respective phase shifts $\phi_1$ and $\phi_2$ are defined relative to the alternating current:

$$I_{AC}(t) = I_{AC}^0 \cdot \cos \omega t \qquad (3).$$

Assuming that the converter conserves the power transferred through it, the power balance between the high-voltage side and the low-voltage side may be expressed as:

$$U_{DC1} \cdot I_{DC1} = U_{DC2} \cdot I_{DC2} \qquad (4).$$

Since the voltage sources only have a small energy storage in the form of a capacitor, as will be explained further below, it is apparent that the DC and the AC power exchange between the two voltage sources have to sum to zero. Hence, the average power balance for voltage source 201 may be formulated as:

$$U_{AC1} \cdot I_{AC}^0 \cdot \cos \phi_1 + (U_{DC1} - U_{DC2}) \cdot I_{DC1} = 0 \qquad (5).$$

Further, the DC power exchange with voltage source 202 amounts to:

$$(I_{DC1} - I_{DC2}) \cdot U_{DC2} \qquad (6).$$

Using the assumed overall power balance, Eq. (4), one realizes that Eq. (6) equals:

$$-(U_{DC1} - U_{DC2}) \cdot I_{DC1} \qquad (7),$$

i.e., the same as that of voltage source 201, Eq. (5), but with opposite sign. Hence, the energy balance, Eq. (7), can be written as:

$$U_{AC2} \cdot I_{AC}^0 \cdot \cos \phi_2 - (U_{DC1} - U_{DC2}) \cdot I_{DC1} = 0 \qquad (8).$$

Combining Eqs. (5) and (8) yields:

$$U_{AC1} \cos \phi_1 + U_{AC2} \cos \phi_2 = 0 \qquad (9).$$

Finally, the voltage equation for the alternating current loop, i.e., current $I_{AC}(t)$ circulating in circuit 209, becomes:

$$U_{AC1} \sin \phi_1 + U_{AC2} \sin \phi_2 = X_c \cdot I_{AC}^0 \qquad (10),$$

where $X_c$ is the impedance of the capacitor, and any inductance of circuit 209, either a stray inductance or a reactor, is neglected.

The above Eqs. (9) and (10) define an equation system which needs to be fulfilled in order for converter 200 to operate in steady-state conditions. One set of solutions which fulfills Eq. (9) is:

$$\phi_1 + \phi_2 = \pi \text{ and } U_{AC1} = U_{AC2} = U_{AC} \qquad (11).$$

In other words, according to Eq. (11) a steady-state operation of converter 200 is obtained by controlling voltage sources 201 and 202 such that the provided voltages $U_1(t)$ and $U_2(t)$ have AC components of equal magnitude and a phase sum equal to π. In addition, to fulfill Eq. (10) there are two choices with regard to $\phi_1$, namely:

$$\varphi_1 = \varphi \qquad (12)$$
and
$$\varphi_1 = \pi - \varphi, \qquad (13)$$
where $$\varphi = \operatorname{asin}\left(\frac{X_c \cdot I_{AC}^0}{2 U_{AC}}\right). \qquad (14)$$

Whether Eq. (12) or (13) is employed depends on the power direction of the converter, i.e., whether power is to be transferred from the first to the second voltage source or vice versa. The angle φ should be kept small in order to maximize the flow of active power between the two voltage sources. Hence, one of the angles $\phi_1$ and $\phi_2$ should be kept close to zero whereas the other should be close to π. In other words, the phase difference between the two voltage sources should be close to π. It will be appreciated by those skilled in the art that the deviation of the phase difference from π depends on the detailed design of the converter, in particular the capacitance and the inductance of circuit 209. Typically, the value of the phase difference is about 0.9 times π.

An operation of converter 200 in accordance with Eq. (11) is the preferable mode of operation, since the power exchange between the voltage sources 201 and 202 is maximized. Capacitor 203 should be sufficiently large, thereby having a low impedance, such that the main part of the AC components of $U_1(t)$ and $U_2(t)$ is used to transfer power between voltage sources 201 and 202. If the capacitor is too small, i.e., has a high impedance, a large portion of the available AC voltage provided by voltage sources 201 and 202 is needed for driving the alternating current. Further, in order to reduce the required current rating for the device, and the losses, current $I_{AC}^0$ should be minimized, i.e., the $U_{AC1}^0$ and $U_{AC2}^0$ should be as large as possible. In practice, $U_{AC1}^0$ and $U_{AC2}^0$ are limited by the voltage which can be provided by voltage sources 201 and 202. Preferably, the voltage sources are operated at a high modulation index, i.e., close to their voltage limit.

In the following, embodiments of the variable voltage sources 201 and 202, comprised in converter 200 discussed with reference to FIGS. 2 and 3, are discussed. In general, variable voltage sources 201 and 202 may be based on cell strings comprising a series-connection of converter cells being arranged for providing a controllable voltage which may assume several discrete levels. In particular, such cell strings are capable of providing a voltage having both a DC component and an AC component.

Figure 4:
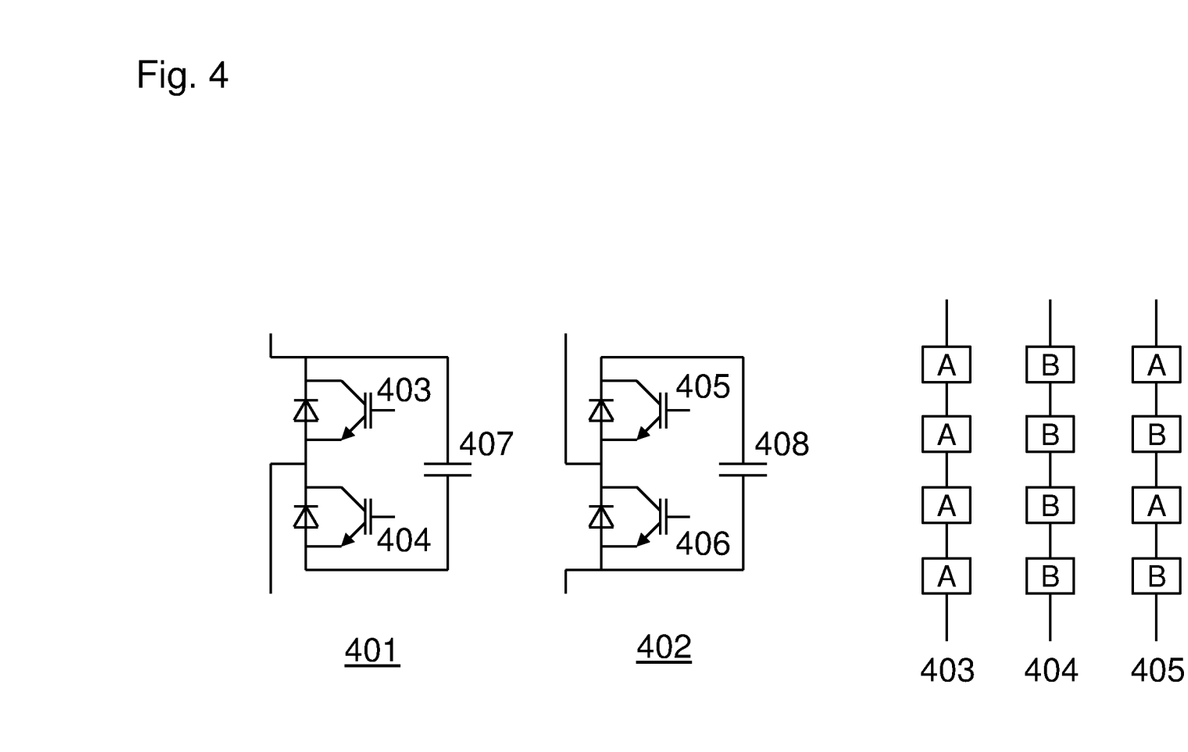
FIG. 4 illustrates converter cells and cell strings, in accordance with an embodiment of the invention.

In FIG. 4, different embodiments of multilevel converter cells are illustrated. For the purpose of elucidating the present invention, the discussion is limited to converter cells of half-bridge type, such as cells 401 and 402. Each cell comprises two switching elements 403-406, e.g., transistors, and in particular IGBTs, and an energy storage element 407/408, such as a capacitor. At any time, each cell may provide a unipolar non-zero voltage contribution or no contribution, depending on the state of the switching elements. For cell types 401 and 402, only one of the switching element may be switched on at a time.

The different types of converter cells 401 and 402 may be connected in series so as to obtain a cell strings, i.e., a variable voltage source. For instance, each cell string 403 may comprise a series-connection of converter cells of type "A" only. Further, each cell string 404 may also comprise solely converter cells of type "B". Finally, each cell string 405 may also comprise a series-connection of two distinct types of converter cells, i.e., "A" and "B", arranged in an alternating sequence, thereby enabling the converter to provide a bipolar voltage. The converter cells are controlled by a control unit, such as control unit 205 discussed with reference to FIG. 2. To this end, by individually setting the status of the switching elements of the converter cells comprised in a cell string, i.e., on or off, the voltage provided by the cell string may be controlled to assume a desired value out of a set of discrete values.

It will be appreciated by the person skilled in the art that the present invention is not limited to the embodiments of variable voltage sources, i.e., cell strings, discussed with reference to FIG. 4, and embodiments of the invention employing other types of variable voltage sources may easily be envisaged. For instance, converter cells of full-bridge type may be utilized, either exclusively or in combination with converter cells of half-bridge type. Converter cells of full-bridge type allow for a bipolar voltage contribution.

Figure 5:
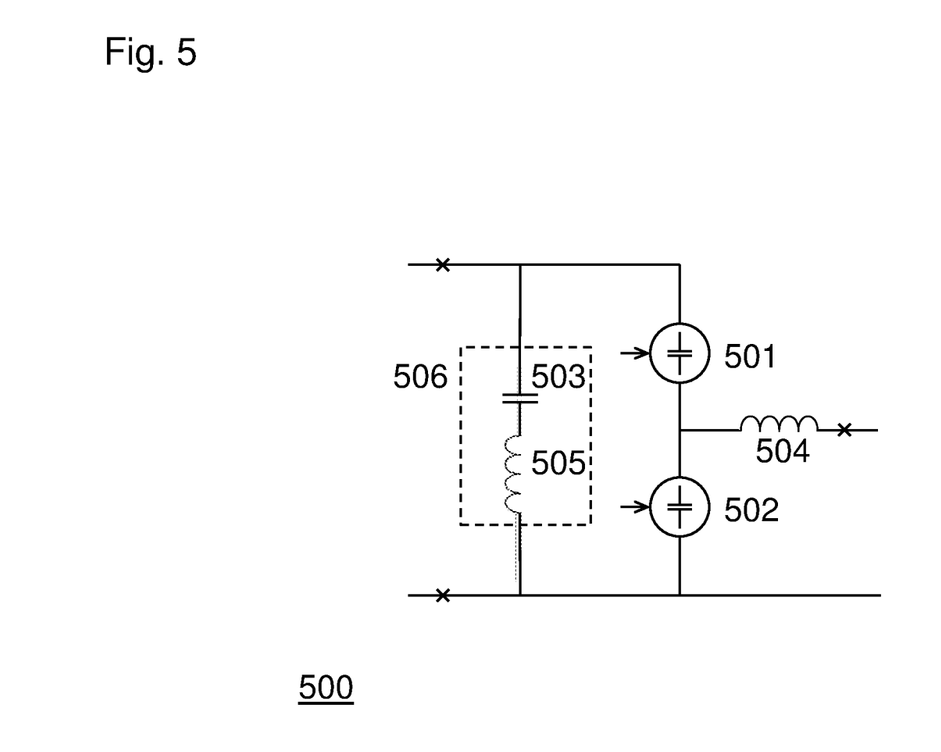
FIG. 5 illustrates a DC-DC converter comprising a resonance circuit for the circulating alternating current, in accordance with an embodiment of the invention.

With reference to FIG. 5, an embodiment of the invention is described. Converter 500 is similar to converter 200, described with reference to FIGS. 2 and 3, in that it comprises two variable voltage sources 501 and 502, a capacitor 503, and an AC filter 504. However, converter 500 further comprises an inductance 505, such as a reactor, connected in series with capacitor 503. The series connection of capacitor 503 and reactor 505 constitutes a series-resonant circuit 506. By adequate choice of the inductance and the capacitance of circuit 506, the resonance frequency of the circuit may be matched to the frequency $\omega$ of the circulating alternating current $I_{AC}(t)$, defined in Eq. (3). Due to the reduced impedance of the series-resonant circuit 506, as compared to the single capacitor 203 of converter 200, a smaller capacitor, i.e., a capacitor with a lower capacitance, may be used. Alternatively, the magnitude of the sum of the AC components provided by voltage sources 501 and 502 may be reduced.

Figure 6:
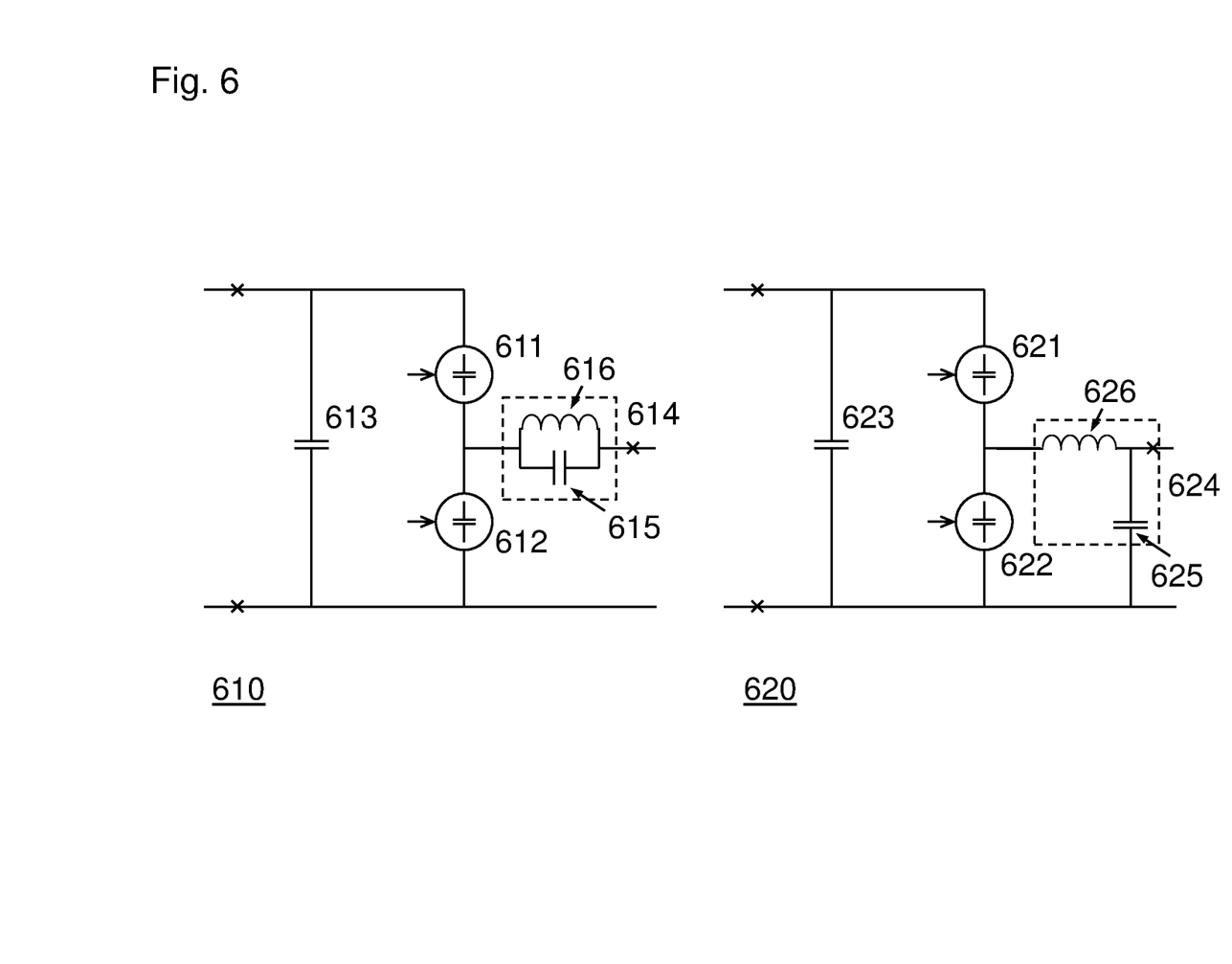
FIG. 6 illustrates a DC-DC converter comprising a resonant AC filter, and a DC-DC converter comprising a low-pass AC filter, in accordance with embodiments of the invention.

With reference to FIG. 6, two further embodiments of the invention are described.

Converters 610 and 620 are similar to converters 200 and 500, discussed hereinabove, in that they comprise two variable voltage sources 611/621 and 612/622, a capacitor 613/623, and an AC filter 614/624. However, instead of reactor 204 utilized in converter 200, converters 610 and 620 employ more advanced AC filters 614 and 624, respectively. More specifically, AC filter 614 of converter 610 comprises a capacitor 615 and a reactor 616 connected in parallel, thereby constituting a parallel resonant series filter. As an alternative, one may utilize a low-pass filter, such as AC filter 624 of converter 620, which comprises a capacitor 625 and a reactor 626.

Figure 7:
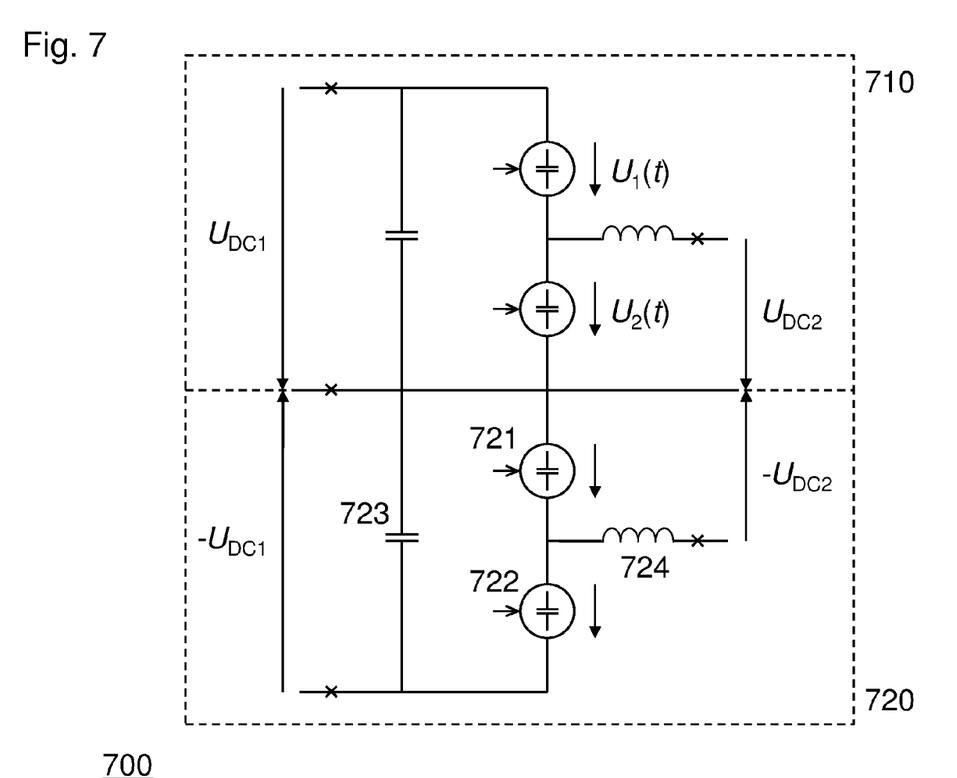
FIG. 7 illustrates a bipolar DC-DC converter, in accordance with an embodiment of the invention.

With reference to FIG. 7, a bipolar DC-DC converter, in accordance with an embodiment of the invention, is illustrated.

Converter 700 comprises two monopolar DC-DC converters, such as converter 200 discussed with reference to FIGS. 2 and 3, which are connected such as to provide a bipolar conversion between a first bipolar DC voltage $U_{DC1}/-U_{DC1}$ and a second bipolar DC voltage $U_{DC2}/-U_{DC2}$. More specifically, a first leg 710 of converter 700, being arranged for converting between $U_{DC1}$ and $U_{DC2}$, is identical to converter 200. A second leg 720 of converter 700, being arranged for converting between $-U_{DC1}$ and $-U_{DC2}$, is similar to converter 200 but is arranged for converting DC voltages of opposite polarity, as compared to converter 200. To this end the two legs 710 and 720 are connected to define a common voltage reference, which is typically connected to earth or to a return line.

By phase shifting the AC voltages of the first 710 and the second 720 phase leg with respect to each other, it is possible to eliminate the AC components such that they will not appear on the DC voltages. This may be achieved by maintaining a phase difference between the respective AC currents of the two phase legs 710 and 720 to be close to $\pi$. Note that the phase difference between the AC components of the two voltage sources within each phase leg is still maintained close to $\pi$. To this end, a first AC current is circulated within the first phase leg 710, and a second AC current is circulated within the second phase leg 720.

Figure 8:
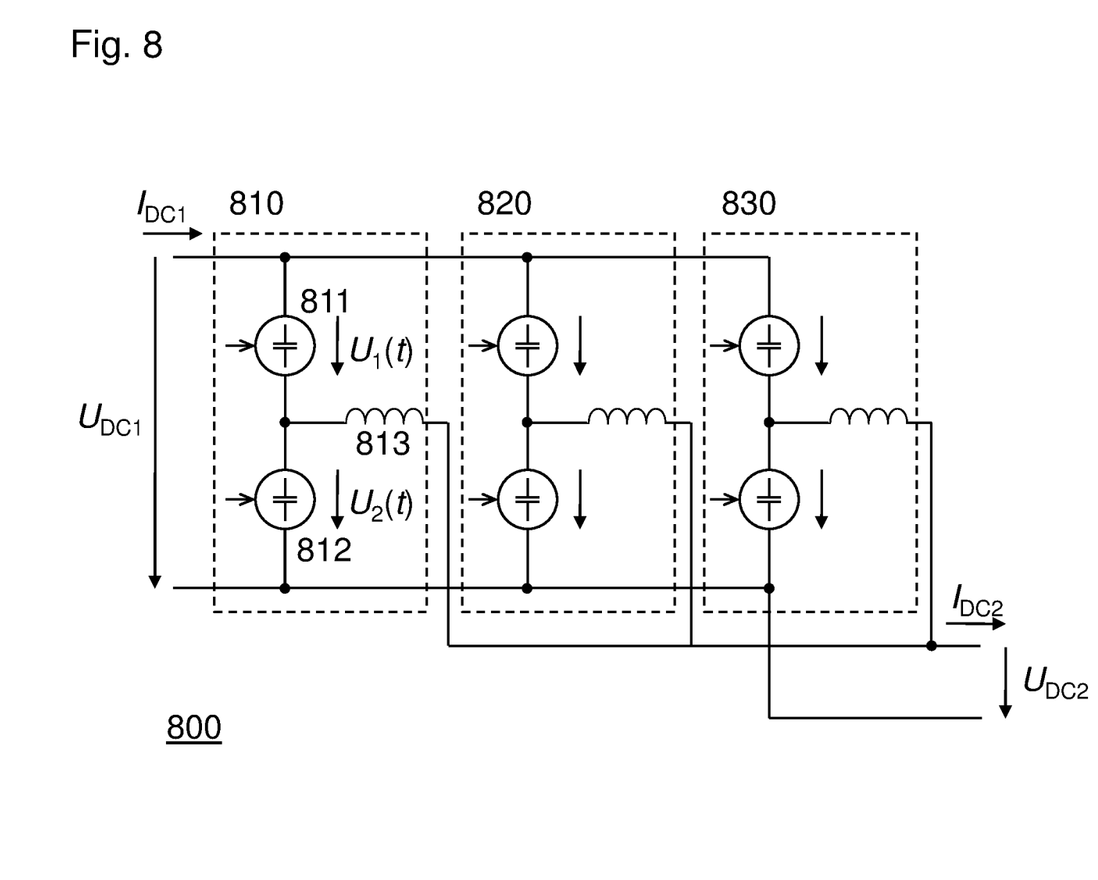
FIG. 8 illustrates a multiphase DC-DC converter, in accordance with another embodiment of the invention.

In the following, a multiphase converter, in accordance with a further embodiment of the invention, is discussed with reference to FIG. 8.

Converter 800 comprises three phase legs 810, 820, and 830, connected in parallel. Phase leg 810 comprises a first variable voltage source 811 and a second variable voltage source 812, as well as means 813, such as a reactor, for limiting the alternating current. Phase legs 820 and 830 are identical to phase leg 810. Converter 800 further comprises a control unit (not shown in FIG. 8) being arranged for controlling the voltage sources of phase legs 810, 820, and 830, so as to circulate an alternating current between the phase legs, as is illustrated in FIG. 9.

Figure 9:
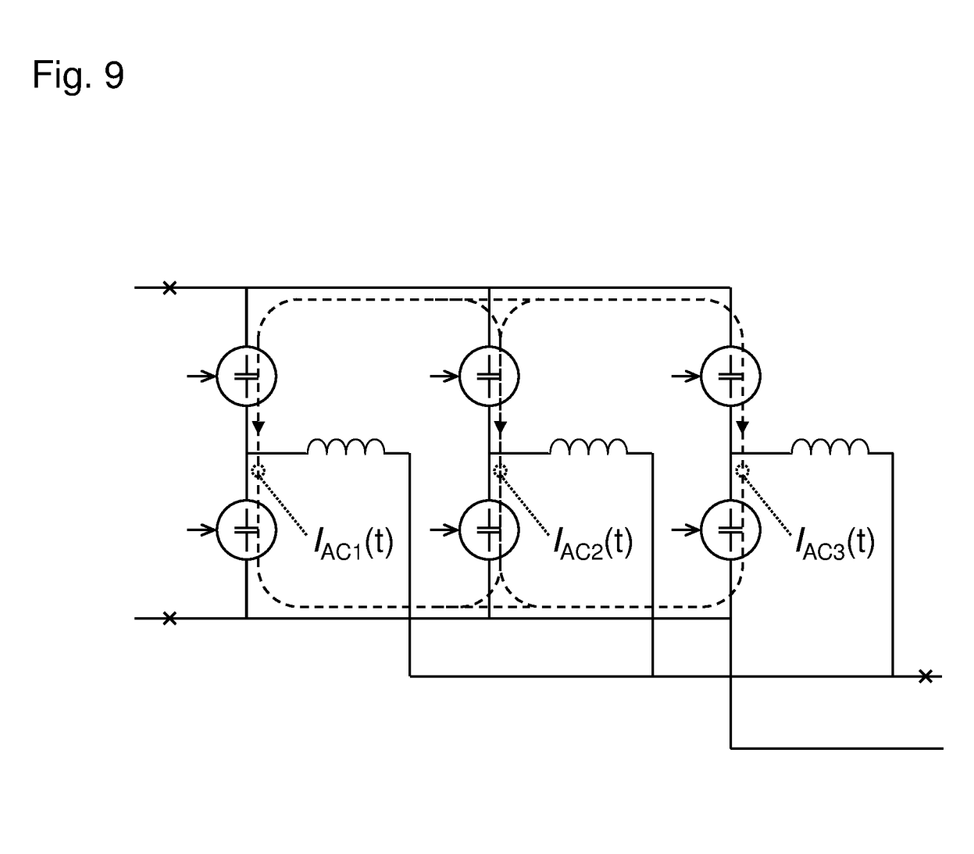
FIG. 9 illustrates the operation of the DC-DC converter shown in FIG. 8, in accordance with an embodiment of the invention.

As is shown in FIG. 9, alternating currents $I_{AC1}(t)$, $I_{AC2}(t)$, and $I_{AC3}(t)$, circulate between the three phase legs 810, 820, and 830. The circulating alternating currents are driven by the respective AC voltage components provided by the first and second voltage sources of each phase leg 810, 820, and 830, i.e., voltage sources 811 and 812 of leg 810, and correspondingly for phase legs 820 and 830. The control unit is arranged for maintaining a constant phase difference between the respective AC voltage components of the phase legs. Preferably, the AC voltages, and the corresponding alternating currents, of phase legs 810, 820, and 830 are arranged to form a symmetric multiphase system. Thus, for a converter comprising three phase legs, such as converter 800, a phase difference of $2\pi/3$ is maintained between the AC voltage of leg 810 and that of leg 820, between the AC voltage of leg 830 and that of 820, and between the AC voltage of leg 810 and that of leg 830. In case of a symmetric multiphase system, the AC components will not appear on the DC voltages $U_{DC1}$ and $U_{DC2}$, as they will cancel out. Therefore, the filtering requirements for a multiphase converter may be reduced. However, means for limiting the circulating alternating current between phase legs 810, 820, and 830, and DC voltage $U_{DC2}$, such as reactor 813, and correspondingly for phase legs 820 and 830, are preferably employed. Note that the phase difference of the AC components of the two voltage sources within each phase leg is still maintained close to $\pi$.

The person skilled in the art realizes that the present invention by no means is limited to the embodiments described above. On the contrary, many modifications and variations are possible within the scope of the appended claims.

In conclusion, a DC-DC converter comprising a first and a second variable voltage source, a capacitor, an alternating current filter, and controlling means, is provided. A first DC voltage $U_{DC1}$ is provided over a series-connection of the first and the second voltage source, and a second DC voltage $U_{DC2}$, being lower in magnitude than $U_{DC1}$, is provided over the second voltage source. The conversion between $U_{DC1}$ and $U_{DC2}$ is effected by circulating an alternating current within a circuit comprising the two voltage sources and the capacitor, thereby exchanging power between the two voltage sources. The alternating current is driven by AC voltage components provided by the first and the second voltage source. The controlling means is arranged for controlling the

The invention claimed is:

1. A DC-DC converter for high voltage direct current (HVDC) power transmission and distribution and for converting a first DC voltage into a second DC voltage or vice versa and comprising:
a first phase leg having a first, a second, and a third connection terminal, the first phase leg comprising:
a first variable voltage source and a second variable voltage source being arranged for providing a first voltage ($U_1(t)$) and a second voltage ($U_2(t)$), respectively, each voltage having an AC voltage component and a DC voltage component, each variable voltage source having a first pole and a second pole, the first pole of the first variable voltage source being connected to the first terminal of the first phase leg, the second pole of the first variable voltage source being connected to the first pole of the second variable voltage source, and the second pole of the second variable voltage source being connected to the second terminal of the first phase leg, wherein the first DC voltage ($U_{DC1}$) is provided between the first terminal and the second terminal of the first phase leg, and the second DC voltage ($U_{DC2}$) is provided between the third terminal and the second terminal of the first phase leg,
a first capacitor being connected between the first terminal and the second terminal of the first phase leg, and being arranged between an input end of the first phase leg of the DC-DC converter and an output end of the first phase leg of the DC-DC converter, wherein the input end of the first phase leg is provided with the first DC voltage ($U_{DC1}$) and the output end of the first phase leg of the DC-DC converter is provided with the second DC voltage ($U_{DC2}$), and
an alternating current, AC, filter being connected between the first pole of the second variable voltage source and third terminal of the first phase leg, and
a control unit configured to control the first variable voltage source and the second variable voltage source of the first phase leg so as to circulate an AC current ($I_{AC}(t)$) within a loop of the first capacitor, the first variable voltage source, and the second variable voltage source, of the first phase leg.

2. The converter according to claim 1, wherein the control unit is arranged for controlling the first variable voltage source and the second variable voltage source of the first phase leg so as to maintain a phase difference between an AC component of the first voltage and an AC component of the second voltage to be close to π.

3. The converter according to claim 1, wherein the first phase leg further comprises a first inductor connected in series with the first capacitor.

4. The converter according to claim 1, wherein each variable voltage source comprises a plurality of converter cells connected in series, each converter cell comprising two switching elements and an energy storage element connected in series with the switching elements.

5. The converter according to claim 1, wherein the AC filter is an inductor.

6. The converter according to claim 1, further comprising:
a second phase leg being identical to the first phase leg, the second terminal of the second phase leg being connected to the second terminal of the first phase leg, wherein a third DC voltage ($U_{DC3}$) is provided between the first terminal and the second terminal of the second phase leg, and a fourth DC voltage ($U_{DC4}$) is provided between the third terminal and the second terminal of the second phase leg,
and wherein the control unit is further configured to control the first variable voltage source and the second variable voltage source of the second phase leg so as to circulate an AC current ($I_{AC}(t)$) within a loop of the first capacitor, the first variable voltage source, and the second variable voltage source, of the second phase leg.

7. The converter according to claim 6, wherein the control unit is further configured to control the first variable voltage source and the second variable voltage source of each phase leg so as to maintain a phase difference between the AC current of first phase leg and the AC current of second phase leg to be close to π.

8. The converter according to claim 3, wherein each variable voltage source comprises a combination of half-bridge and full-bridge type cells.

9. A DC-DC converter for high voltage direct current (HVDC) power transmission and distribution and for converting a first DC voltage into a second DC voltage or vice versa and comprising:
at least two phase legs connected in parallel, each phase leg having a first, a second, and a third connection terminal, wherein each phase leg comprises:
a first variable voltage source and a second variable voltage source being arranged for providing a first voltage ($U_1(t)$) and a second voltage ($U_2(t)$), respectively, each voltage having an AC voltage component and a DC voltage component, each variable voltage source having a first pole and a second pole, the first pole of the first variable voltage source being connected to the first terminal of the phase leg, the second pole of the first variable voltage source being connected to the first pole of the second variable voltage source, and the second pole of the second variable voltage source being connected to the second terminal of the phase leg, wherein the first DC voltage ($U_{DC1}$) is provided between the first terminal and the second terminal of the phase leg, and the second DC voltage ($U_{DC2}$) is provided between the third terminal and the second terminal of the phase leg, and the third terminals of the phase legs are interconnected, and
a control unit configured to control the first variable voltage source and the second variable voltage source of each phase leg to maintain a constant phase difference between the AC voltage components of the phase legs, where the phase difference between two adjacent phase legs is equal to 2π/n, where n is the number of phase legs, so as to circulate an AC current ($I_{AC1}(t)$, $I_{AC2}(t)$, $I_{AC3}(t)$) within a circuit comprising the first variable voltage source and the second variable voltage source of each phase leg, wherein a constant phase difference between the respective AC currents ($I_{AC1}(t)$, $I_{AC2}(t)$, $I_{AC3}(t)$) of the phase legs is maintained.

10. The converter according to claim 9, wherein the control unit is further configured to control the first variable voltage source and the second variable voltage source of each phase leg so as to maintain a phase difference between an AC component of the first voltage and an AC component of the second voltage to be close to π.

11. The converter according to claim 9, wherein the phase difference between the respective AC currents ($I_{AC1}(t)$, $I_{AC2}$ (t), $I_{AC3}(t)$) of two adjacent phase legs is equal to $2\pi/n$, where n is the number of phase legs.

12. The converter according to claim 10, wherein each variable voltage source comprises a combination of half-bridge and full-bridge type cells.

13. The converter according to claim 11, wherein each variable voltage source comprises a combination of half-bridge and full-bridge type cells.

14. A method of a DC-DC converter for high voltage direct current (HVDC) power transmission and distribution and for converting a first DC voltage into a second DC voltage or vice versa and comprising:
- a first phase leg having a first, a second, and a third connection terminal, the first phase leg comprising:
  - a first variable voltage source and a second variable voltage source being arranged for providing a first voltage ($U_1(t)$) and a second voltage ($U_2(t)$), respectively, each voltage having an AC voltage component and a DC voltage component, each variable voltage source having a first pole and a second pole, the first pole of the first variable voltage source being connected to the first terminal of the first phase leg, the second pole of the first variable voltage source being connected to the first pole of the second variable voltage source, and the second pole of the second variable voltage source being connected to the second terminal of the first phase leg, wherein the first DC voltage ($U_{DC1}$) is provided between the first terminal and the second terminal of the first phase leg, and the second DC voltage ($U_{DC2}$) is provided between the third terminal and the second terminal of the first phase leg,
  - a first capacitor being connected between the first terminal and the second terminal of the first phase leg, and being arranged between an input end of the first phase leg of the DC-DC converter and an output end of the first phase leg of the DC-DC converter, wherein the input end of the first phase leg is provided with the first DC voltage ($U_{DC1}$) and the output end of the first phase leg of the DC-DC converter is provided with the second DC voltage ($U_{DC2}$), and
  - an alternating current, AC, filter being connected between the first pole of the second variable voltage source and third terminal of the first phase leg,
- wherein the method comprises:
  - controlling the first variable voltage source and the second variable voltage source of the first phase leg so as to circulate an AC current ($I_{AC}(t)$) within a loop of the first capacitor, the first variable voltage source, and the second variable voltage source, of the first phase leg.

15. The method according to claim 14, further comprising:
- maintaining a phase difference between an AC component of the first voltage and an AC component of the second voltage to be close to $\pi$.

16. A method of a DC-DC converter for high voltage direct current (HVDC) power transmission and distribution and for converting a first DC voltage into a second DC voltage or vice versa and comprising:
- at least two phase legs connected in parallel, each phase leg having a first, a second, and a third connection terminal, wherein each phase leg comprises:
  - a first variable voltage source and a second variable voltage source being arranged for providing a first voltage ($U_1(t)$) and a second voltage ($U_2(t)$), respectively, each voltage having an AC voltage component and a DC voltage component, each variable voltage source having a first pole and a second pole, the first pole of the first variable voltage source being connected to the first terminal of the phase leg, the second pole of the first variable voltage source being connected to the first pole of the second variable voltage source, and the second pole of the second variable voltage source being connected to the second terminal of the phase leg, wherein the first DC voltage ($U_{DC1}$) is provided between the first terminal and the second terminal of the phase leg, and the second DC voltage ($U_{DC2}$) is provided between the third terminal and the second terminal of the phase leg, where the third terminals of the phase legs are interconnected, and
- wherein the method comprises:
  - controlling the first variable voltage source and the second variable voltage source of each phase leg to maintain a constant phase difference between the AC voltage components of the phase legs, where the phase difference between two adjacent phase legs is equal to $2\pi/n$, where n is the number of phase legs, so as to circulate an AC current ($I_{AC1}(t)$, $I_{AC2}(t)$, $I_{AC3}(t)$) within a circuit comprising the first variable voltage source and the second variable voltage source of each phase leg, wherein a constant phase difference between the respective AC currents ($I_{AC1}(t)$, $I_{AC2}(t)$, $I_{AC3}(t)$) of the phase legs is maintained.

17. The method according to claim 16, further comprising:
- maintaining a phase difference between an AC component of the first voltage and an AC component of the second voltage to be close to $\pi$.

18. The method according to claim 16, wherein the phase difference between the respective AC currents ($I_{AC1}(t)$, $I_{AC2}(t)$, $I_{AC3}(t)$) of two adjacent phase legs is equal to $2\pi/n$, where n is the number of phase legs.

* * * * *